United States Patent
Lynn et al.

[15] 3,649,219
[45] Mar. 14, 1972

[54] EXTRACTION OF ALKALI, ALKALINE EARTH AND LEAD HALIDES AND CHLORATES USING AN ACID-AMINE MIXED-EXTRACTANT

[72] Inventors: Scott Lynn; Robert K. Charlesworth, both of Walnut Creek, Calif.

[73] Assignee: The Dow Chemical Company, Midland, Mich.

[22] Filed: May 7, 1969

[21] Appl. No.: 822,701

Related U.S. Application Data

[63] Continuation-in-part of Ser. No. 605,568, Dec. 29, 1966, abandoned.

[52] U.S. Cl. ..........................23/312 AH, 23/312 R, 23/38, 23/89, 23/90, 23/91, 23/97, 23/86
[51] Int. Cl. ....................B01d 11/04, C01d 3/18, C01f 5/26
[58] Field of Search ..........23/309, 312 R, 312 AH, 312 ME, 23/312 AG, 89, 90, 91, 340, 31, 38, 57, 86

[56] References Cited

UNITED STATES PATENTS

| | | | |
|---|---|---|---|
| 3,179,503 | 4/1965 | Horner | 23/312 |
| 3,186,809 | 6/1965 | Krewoy | 23/312 |
| 3,197,274 | 7/1965 | White | 23/312 X |
| 3,214,454 | 10/1965 | Blaser | 23/312 X |
| 3,266,888 | 8/1966 | Goren | 23/312 |
| 3,278,277 | 10/1966 | Goren | 23/312 X |
| 3,409,415 | 11/1968 | Moore | 23/312 ME X |
| 3,479,147 | 11/1969 | Lee | 23/312 AH |
| 3,490,880 | 1/1970 | Charlesworth | 23/312 |

FOREIGN PATENTS OR APPLICATIONS

| | | | |
|---|---|---|---|
| 902,337 | 8/1962 | Great Britain | 23/312 MF |
| 1,013,473 | 12/1965 | Great Britain | 23/312 ME |
| 1,025,866 | 4/1966 | Great Britain | 23/312 ME |

OTHER PUBLICATIONS

Schulz, HW– 79762– PT1, Solv. Ext. of Sr, Cr and RE, with D– 2EHPA, Feb., 1964, pp. 5, 6, 35, 36.
Bray, Nuclear Sci. Engin, Vol 20, Sept.–Dec. 1964, pp 362– 364.
ORNL– 3629, Sci. Chem. Research, Oct. 1964, pp. 195– 202.
Arnold et al., Solv. Extr., I & EC Proc Des and Dev., Vol. 4, No. 3, July, 1965, pp. 249– 254.
Horner et al., Nucl. Sci. Engin, Vol. 17, pp. 234–246, 1963.
Martell, Chem. Eng., Nov. 27, 1961, pp. 95– 104.
Fletcher, Napthenic Acid as a Liq-Liq. Ext. Reagent for Metals, 1961, pp. 355– 366

*Primary Examiner*—Norman Yudkoff
*Assistant Examiner*—S. J. Emery
*Attorney*—Griswold and Burdick, William R. Norris and Lloyd S. Jowanovitz

[57] ABSTRACT

The invention is a novel process for extracting salts from their aqueous solutions for contacting an aqueous salt solution with a substantially water-immiscible solution of an organic acid and an organic base. The resulting salt-containing organic extract is separated from the salt-depleted aqueous raffinate and the salt in turn usually stripped from the extract. Conveniently, water can be used as the stripping agent.

13 Claims, No Drawings

3,649,219

EXTRACTION OF ALKALI, ALKALINE EARTH AND LEAD HALIDES AND CHLORATES USING AN ACID-AMINE MIXED-EXTRACTANT

This application is a continuation-in-part of our application Ser. No. 605,568, filed Dec. 29, 1966 now abandoned.

This invention relates to solvent extraction and more particularly is concerned with a novel process for extracting inorganic salts from aqueous salt solutions and to a novel liquid ion exchange extraction system for use in the process.

It is a principal object of the present invention to provide a novel system and process for extracting inorganic salts from aqueous solutions using liquid-liquid extraction techniques.

It is also an object of the present invention to provide a novel process for recovering or removing selected inorganic salt components from brines, plant waste streams, saline solutions, leach solutions and the like.

It is a further object of the present invention to provide a novel liquid ion exchange process for extracting salts from aqueous solutions which also can provide for selective extraction of anionic and cationic salt components from such aqueous salt solutions.

These and other objects and advantages will become apparent from the detailed description presented hereinafter.

In general, the present novel process comprises providing an aqueous solution containing at least one inorganic salt and contacting the aqueous solution with a substantially water-immiscible solution of an organic acid and an organic base. The salt transfers, i.e., is extracted, into the organic phase. The resulting salt containing organic extract is separated from the inorganic salt depleted aqueous raffinate. Ordinarily, the salt in turn is stripped from the organic extractant and the so-regenerated extractant recycled or reused in a subsequent extraction. Conveniently, for most systems, water can be used as a stripping agent in the practice of the invention.

It is to be understood that the term "salt" as used herein is in accordance with the accepted definition and refers to a compound of a metal or positive ion and a nonmetal or negative ion.

Usually in the practice of the present novel process, an aqueous inorganic salt containing source material is contacted with a substantially water-immiscible solution of an organic carboxylic, phosphoric, phosphonic or sulfonic acid or a phenol (hereinafter considered an acid for the purposes hereof) and a primary, secondary, tertiary or quaternary amine wherein the acid and amine moieties are present in substantially equivalent amounts. Salt species present in the aqueous solution are extracted into the organic phase and the resulting organic extract is separated from the residual aqueous phase.

Ordinarily, to recover the so-extracted salt and/or to regenerate the extractant, the organic extract is contacted with an aqueous liquid, e.g., water, to strip the salt from the organic phase. The salt-depleted organic extractant and aqueous salt mixture are separated. The extractant can be recycled for reuse. If it is of interest to recover the salt values, these can be removed from the aqueous stripping solution by crystallization, precipitation and filtration or other techniques known to one skilled in the art.

In the actual practice of the present invention, ordinarily an aqueous metal salt-containing solution is contacted, at from about room temperature to about 80° C. or higher, with a solution having a mixed, substantially water-insoluble organic acid and amine extractant as solute and a substantially water-immiscible organic liquid as diluent or solvent. Preferably, the temperature range is selected to optimize phase separation rates in some operations, e.g., when continuously treating a 50 percent caustic solution, temperatures of from about 45° to about 70° C. are used. The temperature limits are set by the physical and chemical properties of the particular materials being used.

The quantity of organic extractant to be employed at a minimum is that required to remove a predetermined quantity of salt from an aqueous solution. Usually, the process is carried out on a cyclic or continuous basis wherein an extractant solution is used to contact several volumes of aqueous solution and is regenerated for reuse.

Although the mixed solvent itself can be used directly in the practice of the present invention, usually this reactant is carried in a substantially water-immiscible organic liquid as diluent or solvent to reduce viscosity and operating density of the organic extractant. This serves to improve physical properties and facilitates phase separation during the extraction and any subsequent stripping operations. When such solutions are used they ordinarily contain from about 20 to about 65 weight percent (based on total solution) of the mixed extractant as solute; usually solutions containing from about 35 to about 60 weight percent of the extractant as solute are used.

In carrying out the present novel process, the pH of the system can vary over a wide range without any marked reduction in extraction efficiencies. Ordinarily, the pH is maintained within the range of from about 1 up to that point where metal bases, e.g., $Mg(OH)_2$, start precipitating in the system. For most systems, operations usually are carried out within a pH range of from about 1 to about 8. If desired, lower or higher pH conditions can be employed, although as set forth directly hereinabove, with magnesium chloride brines for example, the tendency for precipitation of metal values increases at the higher basicities and loading of the extractant with salt decreases in stronger acid solutions.

Usually, but not necessarily, the mixed solvent extractant is prepared by mixing equimolar quantities, based on acid and base equivalents, of the amine and acid. Formation of a reaction product is evident by heat evolution and a temperature rise in the mixture. Conveniently, the preparation of the mixed solvent can be carried out in the presence of a diluent or solvent thereby to provide directly a solution of the extractant which can be used in the practice of the process of the invention.

Organic acids suitable for use as a component of the mixed extractant are the substantially aqueous insoluble and/or immiscible carboxylic acids having a total carbon content of at least about four and preferably from about eight to about 16, monoalkyl substituted phosphoric acids wherein the alkyl group has a total carbon content of at least about four and preferably from about eight to about 16, sulfonic acids, phosphonic acids, phenols, which for present purposes are considered acids, and the like. Long chain straight and branched chain aliphatic carboxylic acids having a total of from about eight to 13 carbon atoms have been found to be particularly effective for most systems.

Illustrative examples of substantially water-immiscible organic acids suitable for use in the practice of the present invention are butanoic, hexanoic, 2,4-dinitrophenol, 2-ethylhexanoic, α-hydroxy caprylic, α-bromocaprylic, mandelic, phenylacetic, 2-amino octanoic, Versatic aliphatic carboxylic acids having from about nine to about 15 carbon atoms, isodecanoic, neodecanoic, 2,6-dinitro-p(t-butyl)phenol, neotridecanoic, 2-(p-tert.-butylphenoxy)propionic, benzilic, dodecenylsuccinic, α-hydroxystearic, naphthenic (cycloalkyl carboxylics) such as cyclohexylcarboxylic, 4-sec.-butyl-2-(α-methylbenzyl)phenol; bis(2-ethylhexyl)phosphoric, dinonylnaphthalene sulfonic acid and the like.

Substantially water-insoluble and water-immiscible primary, secondary, tertiary and quaternary amines having a total carbon content of at least about six, and preferably from about eight to about 18, can be used as the amine component of the mixed extractant. For most operations, quaternary or primary amines are preferred since these exhibit increased efficiencies in the mixed extractant over that shown by the secondary or tertiary amines.

Illustrative amine components are represented by hexylamine, triethylamine, octylamine, 2-benzyl pyridine, dicyclohexylamine, Primene long chain aliphatic primary amines, di-2-ethylhexylamine, N,N-dibenzyl ethanolamine, Arquad quaternary ammoniums having one or more alkyl groups ranging in chain length from about $C_8$ to about $C_{18}$, Aliquat quaternary ammoniums derived from fatty acid amines, 1,1,3,3-tetramethyl butyl amine, Alamine tricaprylylamines, N-methylcyclohexylamine N,N-diethylcyclohexylamine and the like.

Substantially water immiscible organics having both amine and acid moieties in the same molecule also are suitable for use as extractants in the practice of the present invention. Illustrative examples are 2-(4-nonyl-1(2H)-pyridyl)butyric acid,

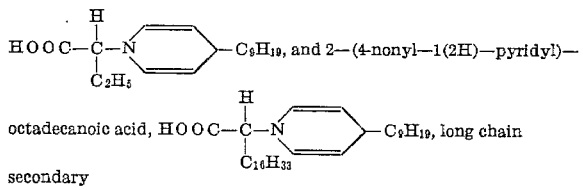

long chain secondary aliphatic amine and carboxylate containing compounds and the like.

The actual selection of acid and amine for use as mixed extractant with a given aqueous salt solution is determined to some extent by the nature of the extraction to be carried out. Various species of the disclosed mixed extractant systems have been found to offer the additional advantage of providing selective extraction which preferentially removes certain salts from an aqueous solution containing a number of different salt species. Because of this unexpected utility, the present invention has been found to be particularly effective in removing scale forming contaminants from brine used in desalination processes and for removing byproduct contaminants from process streams.

Substantially water immiscible alcohols, esters, ketones, hydrocarbons, halogenated hydrocarbons and the like organic liquids which possess the requisite solvent properties are suitable for use as solvents for the mixed organic acid-amine extractant in the practice of the process of the present invention. In general, the selection of a particular solvent or solvent mixture for use in an actual extraction operation will be determined so as to assure that it exhibits the requisite solubility characteristics and does not detrimentally interact with, i.e., react with or otherwise adversely influence, the other components of the extractant mixture under the operating conditions.

Solvents which have been found to be particularly suited for use in the practice of the present invention are toluene, kerosene, aromatic hydrocarbons, butano, octanol, methyl isobutyl ketone, benzonitrile, and the like.

The following examples will serve further to illustrate the present invention but are not meant to limit it thereto.

EXAMPLE 1

About 17.5 millimoles of Aliquat 336 quaternary amine ($\approx$73–77 percent tricaprylyl methyl ammonium chloride having an equivalent weight of about 500) and about 17.5 millimoles of 2-ethylhexanoic acid were mixed together and neutralized with about 17.6 millimoles of sodium hydroxide. The resulting substantially water immiscible organic acid-amine liquid extractant was equilibrated by shaking with excess of a saturated aqueous sodium chloride solution. The mixture was allowed to settle and the resulting organic extract separated from the aqueous phase. The salt containing mixed organic acid-amine extract weighed about 12.97 grams. A portion of the extract (6.71 grams) was taken and stripped with three separate portions of water. Each of the aqueous strip solutions was analyzed for sodium chloride and gave the following results: first strip — 3.75 millimoles (mmoles) NaCl; second strip — 0.37 mmole NaCl; third strip — 0.02 mmole NaCl. These results clearly indicate the effectiveness of the extractant for removing salt from aqueous salt solutions and show the recovery of such extracted salt by a water strip.

EXAMPLE 2

Following the same technique and procedure as set forth in Example 1, a mixed organic acid-amine extractant was prepared by reacting about 17.3 mmoles of Aliquat 336 quaternary ammonium chloride and about 17.1 mmoles bis(2-ethylhexyl) phosphoric acid and neutralizing the mixture with about 17.6 mmoles of sodium hydroxide.

The resulting extractant was equilibrated by shaking with an excess of a saturated sodium chloride solution and the resulting organic extract ($\approx$14.1 grams) separated. About 6.72 grams of the extract was stripped with three separate portions of water. The aqueous strip solutions upon analysis for sodium chloride showed respectively 1.21, 0.39 and 0.12 mmoles NaCl.

EXAMPLE 3

About 52 mmoles of each of isodecanoic acid and Aliquat 336 quaternary ammonium chloride were mixed together and neutralized with 10 milliliters of 5.5 normal sodium hydroxide ($\approx$55 millimoles NaOH). The resulting two-phase organic and aqueous system was separated into its component parts. The organic acid-amine extractant was diluted with an equal quantity of Shell 42 aromatic hydrocarbon solvent.

Separate portions of the extractant solution were equilibrated by shaking at 1:1 volume proportion with a basic brine ($\approx$2.5 N in NaOH) of predetermined sodium chloride content. The concentration of sodium chloride and sodium hydroxide in the aqueous phase before and after equilibration was determined by titration. On the basis of this analysis, the sodium chloride and sodium hydroxide extracted by the organic phase was calculated by difference.

Duplicate runs were made at room temperature, i.e., $\approx$20L C., and at about 70L C.

In all of the runs, substantially no sodium hydroxide was found to have been coextracted with the sodium chloride into the organic phase during the extraction step. The extraction of sodium chloride is summarized in Table I.

TABLE I

| Run No. | Initial Aqueous Sodium Chloride Solution (N) | Organic Extract (NaCl Normality) |
|---|---|---|
| Room Temperature | | |
| 1 | 0.5 | 0.07 |
| 2 | 1.0 | 0.12 |
| 3 | 1.5 | 0.16 |
| 4 | 2.0 | 0.20 |
| 5 | 3.0 | 0.28 |
| 6 | 4.0 | 0.36 |
| 70° C. | | |
| 7 | 0.5 | 0.05 |
| 8 | 1.0 | 0.10 |
| 9 | 1.5 | 0.14 |
| 10 | 2.0 | 0.16 |
| 11 | 2.5 | 0.20 |
| 12 | 3.0 | 0.23 |
| 13 | 4.0 | 0.29 |

EXAMPLE 4

About equimolar quantities of Primene 81-R primary aliphatic amine having a total of from about 12 to about 14 carbon atoms and isodecanoic acid were mixed with stirring in the presence of an equal volume of toluene as a solvent. A portion of the resulting mixed organic acid-amine extractant solution was placed in a separatory funnel with about an equal volume of an aqueous magnesium chloride solution of predetermined concentration. The resulting mixture was agitated for about 5 minutes at room temperature. After this period, the phases were allowed to separate and the organic extract separated from the residual aqueous magnesium chloride solution.

The organic extract and residual aqueous solution were analyzed for magnesium chloride. Pertinent data are summarized in Table II.

TABLE II

| Run No. | Magnesium Chloride Solution weight percent MgCl$_2$ | | Organic Extract (MgCl$_2$ wt. %) |
|---|---|---|---|
| | Initial | Residual | |
| 1 | 1.01 | 0.90 | 0.12 |
| 2 | 1.95 | 1.80 | 0.27 |
| 3 | 4.84 | 4.49 | 0.57 |
| 4 | 8.97 | 8.41 | 0.94 |
| 5 | 13.43 | 13.29 | 1.18 |
| 6 | 12.62 | 16.42 | 1.61 |
| 7 | 20.71 | 20.20 | 2.21 |
| 8 | not det'd | 22.49 | 2.76 |
| 9 | not det'd | 25.75 | 3.72 |
| 10 | not det'd | 27.18 | 4.22 |

EXAMPLE 5

The same type organic acid-amine extractant in toluene solution as described in Example 4 was used in extraction studies carried out on aqueous solutions containing various concentrations of a mixture of magnesium chloride and sodium chloride. The extraction and analytical procedure followed also were the same as set forth in Example 4. Table III summarizes the data obtained from these runs.

TABLE III

| Run number | Residual aqueous solution | | | Organic extract | | |
|---|---|---|---|---|---|---|
| | Wt. percent* | | Mg/Na ratio | Wt. percent* | | Mg/Na ratio |
| | Mg | Na | | Mg | Na | |
| 1 | 3.21 | 0.33 | 9.7 | 0.32 | .002 | 160 |
| 2 | 3.24 | 0.68 | 4.8 | 0.32 | .003 | 91 |
| 3 | 3.14 | 1.70 | 1.84 | 0.35 | .005 | 70 |
| 4 | 3.01 | 2.57 | 1.17 | 0.46 | .009 | 51 |
| 5 | 1.94 | 5.05 | 0.4 | 0.39 | .015 | 26 |
| 6 | 0.95 | 5.43 | 0.2 | 0.26 | .019 | 22 |
| 7 | 0.34 | 5.31 | 0.06 | 0.16 | .024 | 6 |
| 8 | 0.14 | 5.30 | 0.03 | 0.13 | .03 | 4 |
| 9 | 4.63 | 0.42 | 11.0 | 0.50 | .001 | 500 |
| 10 | 4.79 | 0.90 | 5.3 | 0.51 | .002 | 255 |
| 11 | 4.84 | 2.06 | 2.3 | 0.71 | .002 | 355 |
| 12 | 4.58 | 2.85 | 1.6 | 0.71 | .003 | 237 |
| 13 | 6.05 | 0.26 | 23.3 | 0.82 | .001 | 820 |
| 14 | 5.90 | 0.74 | 8 | 0.85 | .001 | 850 |
| 15 | 5.77 | 1.39 | 4.15 | 0.89 | .001 | 890 |
| 16 | 1.64 | 4.29 | 0.4 | 0.27 | .01 | 27 |
| 17 | 1.73 | 6.26 | 0.3 | 0.37 | .01 | 37 |
| 18 | 1.46 | 7.82 | 0.2 | 0.2 | .03 | 15 |
| 19 | 0.64 | 8.06 | 0.1 | 0.37 | .02 | 18.5 |
| 20 | 0.08 | 9.07 | 0.01 | 0.21 | .03 | 7 |
| 21 | 0.38 | 1.38 | 0.3 | 0.07 | .003 | 23 |

*Expressed as equivalent Mg and Na.

EXAMPLE 6

The salt solution was agitated with about an equal volume of the mixed organic acid-amine extractant solution at room temperature for about 5 minutes in a separatory funnel. After this period, the two phases were separated and the organic extract analyzed for salt content.

A mixed organic acid-amine extractant solution as described in Example 4 was prepared and used in extraction studies carried out with mixed salt solutions. In this work, predetermined amounts of two salts were used as solute in an aqueous solution.

From this analysis, the ditribution coefficient ($K_A°$) for each salt, i.e., the ratio of concentration of salt in the organic extract to the concentration of the same salt in the residual aqueous raffinate, was determined. Additionally, the selectivity, ratio of $K_A°$ salt $1/K_A°$ salt 2, of extraction was determined. The results of this study are summarized in Table IV.

In a separate run, a toluene solution about 0.5 molar with respect to a mixed organic acid-amine extractant prepared by reacting equimolar quantities of isodecanoic acid and Primene JM-T aliphatic primary amine having from about 18 to about 22 carbon atoms was prepared.

TABLE IV

| Run Number | Extracted aqueous salt solution | | | | Distribution coefficient | | Selectivity $K_A°$ (salt 1) / $K_A°$ (salt 2) |
|---|---|---|---|---|---|---|---|
| | Salt 1 | | Salt 2 | | | | |
| | Type | Conc. (molar) | Type | Conc. (molar) | Salt 1 $K_A°$ | Salt 2 $K_A°$ | |
| 1 | MgCl$_2$ | 1.6 | CaCl$_2$ | 0.7 | 0.016 | 0.14 | 0.11 |
| 2 | MgCl$_2$ | 1.0 | SrCl$_2$ | 1.0 | 0.033 | 0.069 | 0.48 |
| 3 | MgCl$_2$ | 1.25 | LiCl | 2.5 | 0.15 | 0.35 | 4.3 |
| 4 | MgCl$_2$ | 1.0 | KCl | 2.0 | 0.22 | <0.001 | >220 |
| 5 | CaCl$_2$ | 1.0 | SrCl$_2$ | 0.9 | 0.076 | 0.016 | 6.3 |
| 6 | NaCl | 1.7 | KCl | 2.1 | 0.014 | 0.005 | 2.6 |
| 7 | MgCl$_2$ | 0.2 | PbCl$_2$ | 0.06 | Nil | 2.36 | -- |
| 8 | MgCl$_2$ | 1.0 | ZnCl$_2$ | 0.4 | Nil | 1.56 | -- |
| 9 | MgCl$_2$ | 1.1 | NiCl$_2$ | 0.6 | Nil | 0.67 | -- |

This extractant was equilibrated with about an equal volume of an aqueous salt solution which was about 1 molar in magnesium chloride (≈24 g./l. Mg equivalent) and about 0.2 molar (≈13 g./l. Zn equivalent) in zinc chloride. The resulting organic extract after separation from the aqueous raffinate was stripped with water and the aqueous phases analyzed.

The aqueous raffinate, expressed as metal ion equivalent, was found to contain 20.6 g./l. Mg and 1.4 g./l. Zn. The strip solution analyzed 0.01 g./l. Mg and 2.5 g/l. Zn.

To determine the actual loading of the organic extract, the organic phase was contacted with about an equal volume of 1 N aqueous hydrochloric acid, the acidic aqueous solution separated from the organic extractant and the aqueous phase analyzed. This showed Mg less than 0.01 g/l. and Zn 6.2 g/l. Accordingly, the extraction coefficient for magnesium chloride in this system is about 0.0004 and for zinc chloride is about 0.67. This indicates a high selectivity for zinc chloride over magnesium chloride in this particular aqueous salt-mixed organic extractant system.

EXAMPLE 7

About equimolar quantities of isodecanoic acid and a preselected amine were reacted in toluene to provide a solution having about 50 weight percent of the mixed organic acid-amine extractant as solute.

The extraction solution was contacted with agitation at about room temperature with an equal volume of an aqueous magnesium chloride solution containing about 20 weight percent MgCl$_2$ (≈4 normal in Mg$^{++}$ ion). After the contact period, the aqueous raffinate and organic extract were separated and the magnesium chloride content of the resulting extract determined. Table V summarizes the results of this study.

TABLE V

| Run No. | Amine Component | $MgCl_2$ Concentration N* |
|---|---|---|
| | Primary Amines | |
| 1 | 1,1,3,3-tetramethylbutyl | 0.57 |
| 2 | Primene-81R aliphatic ** | 0.45 |
| 3 | Primene-JMT aliphatic *** | 0.37 |
| | Secondary Amine | |
| 4 | di-(2-ethylhexyl) | 0.11 |
| | Tertiary Amine | |
| 5 | Alamine 336 tricaprylylamine | 0.015 |

* Expressed as $Mg^{++}$ ion equivalent

** Contains about 12–14 carbon atoms

*** Contains about 18–22 carbon atoms.

EXAMPLE 8

About equal volumes of an aqueous salt solution containing about 500 g/l. $MgCl_2$ (equivalent to about 125 g./l. Mg) and about 3.4 g./l. $CaCl_2$ (equivalent to about 1.2 g./l. Ca) and a kerosene solution 0.2 molar in Primene JM-T aliphatic primary amine and 0.2 molar in sodium dinonylnaphthalene sulfonate were equilibrated. A second study was made wherein the organic extractant solution also was about 0.2 molar with respect to butanol as a solvent member.

As a control, a solution of 0.2 molar butanol in kerosene was used as extractant with a separate sample of the magnesium chloride brine.

In each case the resulting organic extract was separated from the residual aqueous solution and stripped with water. For purposes of determining the total amount of calcium chloride and magnesium chloride extracted a second strip with 1 normal hydrochloric acid also was employed. The aqueous and aqueous acid strip solutions were analyzed for calcium chloride and magnesium chloride.

The results of these studies are summarized in Table VI.

TABLE VI

| | | Strip results | | | |
|---|---|---|---|---|---|
| | | $MgCl_2$, g./l. expressed as $Mg^{++}$ | | $CaCl_2$, g/l. expressed as $Ca^{++}$ | |
| Run No. | Extractant solvent | $H_2O$ | HCl | $H_2O$ | HCl |
| 1 | Kerosene | 0.026 | 0.017 | 0.01 | 0.28 |
| 2 | Kerosene plus butanol | 0.55 | 0.076 | 0.18 | 0.10 |
| Control | Kerosene plus butanol (no acid or amine). | 0.001 | ~0.001 | Neg. | Neg. |

These results indicate the selectivity of this specific extractant system for calcium over magnesium. Additionally, it illustrates the increased effectiveness of butanol as a cosolvent for use with this specific amine-acid extractant system.

EXAMPLE 9

About equal volumes of a toluene solution which was about 0.5 molar in isodecanoic acid and about 0.05 molar in N-methyl cyclohexylamine and an aqueous 20 weight percent magnesium chloride solution were equilibrated. The resulting organic extract was separated from the aqueous raffinate and stripped by contacting with an equal volume of water. Analysis of the strip solution indicated magnesium chloride, expressed as Mg equivalent, of about 0.8 g/l.

EXAMPLE 10

About equal volumes of a benzonitrile solution about 0.5 molar in isodecanoic acid and 0.5 molar in Alamine 336 trioctylamine and an aqueous 20 weight percent magnesium chloride solution were equilibrated. The resulting magnesium chloride containing organic extract was separated from the aqueous raffinate and striped with about an equal volume of water. Analysis of the strip solution indicated magnesium chloride, expressed as equivalent magnesium, of about 1.0 g/l.

EXAMPLE 11

About equimolar quantities of Primene 81-R primary aliphatic amine and isodecanoic acid were reacted and dissolved in a predetermined amount of n-butanol solvent. The resulting extractant was equilibrated with about an equal volume of an aqueous magnesium chloride solution ($\approx 300$ g/l. $MgCl_2$). The resulting organic extract was separated from the aqueous raffinate and analyzed for magnesium chloride. Table VII, which follows, summarizes the extraction data obtained for solutions of various weight concentrations of the mixed organic acid-amine solute.

TABLE VII

| Run No. | Acid-Amine Solute (% by wt.) | $MgCl_2$ Concentration in Organic Extract g./l. $Mg^{++}$ |
|---|---|---|
| Control | 0 (butanol alone) | 2.8 |
| 1 | 10 | 5.5 |
| 2 | 20 | 7.2 |
| 3 | 30 | 8.25 |
| 4 | 40 | 9.1 |
| 5 | 50 | 9.7 |
| 6 | 60 | 10.0 |
| 7 | 70 | 9.95 |
| 8 | 80 | 9.5 |
| 9 | 100 | 3.8 |

EXAMPLE 12

About equal volumes of an 0.5 molar solution of N,N-diethylcyclohexyl amine and 0.5 molar neotridecanoic acid in toluene and an aqueous magnesium chloride solution ($\approx 2.5$ molar $MgCl_2$) were equilibrated; the resulting organic extract phase and aqueous raffinate were separated and the organic extract stripped with water. The magnesium chloride content of the strip solution was determined and found to contain 0.23 g./l. of the solute expressed as equivalent Mg.

EXAMPLE 13

About equal volumes of an aqueous 20 percent magnesium chloride solution and a toluene solution prepared by mixing 1 molar equivalent of p-t-butylbenzoic acid and 1 molar equivalent of Aliquat 336 quaternary amine were stirred together. The organic and aqueous phases were separated and the organic extract stripped with an equal volume of water. The stripped organic extract was subsequently stripped, as an analytical procedure, with about an equal volume of 1 normal hydrochloric acid to substantially completely remove the magnesium chloride from the organic phase. Analysis of the strip solutions for magnesium chloride, expressed as Cl, indicated for the aqueous strip about 0.46 g./l. and for the acid post strip 0.27 g./l.

EXAMPLE 14

An extractant consisting of 2,6-dinitro-p-(t-butyl)phenol and Aliquat 336 quaternary amine at about 0.5 N in toluene was equilibrated with about an equal volume of a synthetic brine containing about 34.6 weight percent magnesium chloride and small amounts of calcium chloride, sodium chloride and boron values as the other major constituents. Following the mixing and agitation of the organic extractant and brine, the two phases were allowed to settle and were separated. The resulting organic extract was stripped by contact with about an equal volume of water. The original brine solution, aqueous raffinate and aqueous strip, were analyzed. Table VIII summarizes the result of this study. In this table, the salt values are expressed as elements as determined from the chemical analysis.

TABLE VIII

|  | Original Brine Head Solution g./l. | Raffinate g./l. | Aqueous Strip g./l. |
|---|---|---|---|
| Mg | 115 | 111 | 4.4 |
| Ca | 0.66 | 0.167 | 0.365 |
| Na | 4.3 | nil | nil |
| B | 0.012 | nil | nil |
| Cl | 345 | 324 | 15 |

This study showed that the extraction coefficient $K_A°$ for calcium chloride was about 2.2 and for magnesium chloride was about 0.040 indicating a selectivity for $Ca^{++}$ over $Mg^{++}$ of about 55 to 1. Substantially no sodium chloride or boron values were found to be extracted with this particular system.

EXAMPLE 15

The present novel process was used in a pilot operation to strip both sodium chloride and sodium chlorate, preferentially sodium chlorate from an aqueous caustic (NaOH) product stream with only minimal sodium hydroxide extraction.

In this operation, an aqueous caustic feed containing about 50 weight percent caustic, and as contaminants about 2 weight percent sodium chloride and from about 1,040–1,100 parts per million sodium chlorate, was heated to about 60° C. A stream of the aqueous caustic was fed at a predetermined flow rate into the top of a 4 inch inside diameter, two- or four-stage agitator equipped column. A mixed organic acid-amine extractant consisting of three parts by weight neodecanoic acid, six parts by weight Aliquat 336 quaternary amine and 11 parts by weight Shell Aromatic Solvent No. 42 was heated to about 60° C. and fed into the bottom of the column. As the organic extractant entered the first mixing section at the bottom of the column it was thoroughly mixed with the descending caustic passing in countercurrent flow down through the column. The resulting agitated mixture passed to a separation stage, where the phases are separated, the organic extractant rising up the column to the next higher mixing stage and the caustic passing downward. The mixing-separating cycles were repeated as the extractant passed up through the column and the caustic solution passed downwardly therethrough. The purified caustic was removed from the bottom of the column. As the resulting organic extract passed out of the top of the column it was transported to the bottom of a packed stripping column. This extract was passed upwards in countercurrent flow in contact with a descending stream of water. The stripping water was discarded after analysis and the regenerated extractant recycled for extraction with fresh caustic solution. Table IX summarizes the processing data and results for a number of runs wherein feed rates of the caustic liquor, organic extractant and aqueous strip media were varied from run to run.

EXAMPLE 16

About 50 milliliters of a 0.1 molar solution of 2-(4-nonyl-1 (2H)-pyridyl)butyric acid in kerosene or a 0.1 molar solution of 2-(4-nonyl-1(2H)-pyridyl)octadecanoic acid in kerosene was shaken with separate 50 milliliter portions of a 20 weight percent aqueous magnesium chloride solution containing 5 milliequivalents of magnesium hydroxide to neutralize the carboxylic acid group. The resulting organic extracts were separated from the residual salt solution and stripped successively with water and 1 molar hydrochloric acid using substantially equal volumes of the organic extract and the aqueous or aqueous acid stripping media.

The results of this study are summarized in TABLE X.

TABLE X

| Run No. | Extractant | Results Mg ion Normality | |
|---|---|---|---|
| | | Water Strip | HCl Strip |
| 1 | 2-(4-nonyl-1(2H)-pyridyl)-butyric acid | 0.03 | 0.001 |
| 2 | 2-(4-nonyl-1(2H)-pyridyl)-octadecanoic acid | 0.043 | 0.001 |

These results indicate about a 30-40 percent loading of the extractant.

EXAMPLE 17

The effect of the amine/acid moiety ratio is explored in the following operations. An aqueous solution containing approximately 20 percent by weight magnesium chloride was extracted with a series of extractant mixtures of isodecanoic acid and a primary aliphatic amine containing about 13 carbons (Primene-81R amine) dissolved in toluene. Each extraction operation was conducted in a manner similar to the experimental procedure employed in the foregoing example.

The composition of the liquid extractant is set forth in the following table along with the concentration of magnesium contained in the organic extractant.

TABLE XI

| Run Number | Extractant mixture, weight percent | | | $Mg^{++}$ molar concentration |
|---|---|---|---|---|
| | Acid | Amine | Toluene | |
| 1 | 23 | --------- | 76 | 0 |
| 2 | 23 | 13.5 | 63.5 | .068 |
| 3 | *23 | *27 | 50 | .187 |
| 4 | 23 | 40.5 | 36.5 | **.104 |
| 5 | 23 | 54 | 23 | ***Pptn. |

*Equimolar concentrations.
**Precipitate formed on standing for about 16 hours.
***Pptn.=Precipitate formed almost immediately after contact with the aqueous system.

Although best results are achieved with stoichiometric amounts of the amine and acid, the process can be successfully practiced employing large excesses of either the amine or acid. The precipitation occurring in run number 4 occurred only after an extended period of contact with the aqueous

TABLE IX

| Run No. | Column agitator speed, r.p.m. | Caustic feed | | | Caustic feed rate, cc./min. | Organic extractant feed rate, cc./min. | Aqueous strip feed rate, cc./min. | Caustic product | | | Aqueous strip | | |
|---|---|---|---|---|---|---|---|---|---|---|---|---|---|
| | | NaOH wt. percent | NaCl wt. percent | NaClO₃, p.p.m. | | | | NaOH, wt. percent | NaCl, wt. percent | NaClO₃, p.p.m. | NaOH, wt. percent | NaCl, wt. percent | NaClO₃ p.p.m. |
| 1* | 350 | 50.1 | 2.02 | 1,040 | 100 | 200 | 200 | 47.9 | 1.45 | 9 | 0.12 | 0.24 | 420 |
| 2* | 350 | 50.1 | 2.02 | 1,040 | 200 | 200 | 200 | 48.7 | 1.75 | 10 | 0.06 | 0.24 | 640 |
| 3* | 500 | 50.1 | 2.02 | 1,040 | 50 | 200 | 200 | 42.8 | 0.66 | 24 | 0.03 | 0.15 | 60 |
| 4* | 500 | 50.2 | 2.16 | 1,100 | 67 | 200 | 400 | 45.2 | 1.30 | 23 | 0.23 | 0.10 | 102 |
| 5** | 320 | 50.3 | 2.09 | ~1,000 | 190 | 580 | 420 | 44.3 | 1.62 | 5 | 0.08 | 0 24 | 456 |
| 6** | 330 | 50.3 | 2.09 | 1,000 | 210 | 510 | 300 | 43.6 | 1.42 | 9 | 0.09 | 0.42 | 588 |
| 7** | 340 | 50.3 | 2.09 | 1,000 | 200 | 600 | 340 | 45.2 | 1.37 | 13 | 0.05 | 0.34 | 680 |
| 8** | 320 | 50.3 | 2.09 | 1,000 | 190 | 620 | 300 | 47.0 | 1.37 | ~13 | 0.04 | 0.37 | ~690 |
| 9** | 150 | 50.3 | 2.09 | 1,000 | 675 | 1,720 | 500 | 48.5 | 1.88 | ~15 | 0.07 | 0.20 | ~600 |
| 10** | 350 | 50.3 | 2.09 | 1,000 | 675 | 1,950 | 675 | 46.2 | 1.47 | ~20 | 0.08 | 0.46 | ~600 |
| 11** | 400 | 49.9 | 2.03 | 1,000 | 700 | 1,840 | 760 | 45.0 | 1.35 | ~20 | 0.19 | 0.51 | ~600 |

*2 stage column.  **4 stage column.

solution being extracted. Apparently the pH of the system is modified sufficiently, with the employment of a large excess of the amine, to precipitate magnesium hydroxide. Such difficulties would of course be minimized with the employment of nearly stoichiometric quantities of the extractant reagents.

Various modifications can be made in the present invention without departing from the spirit or scope thereof for it is understood that we limit ourselves only as defined in the appended claims.

What is claimed is:

1. A process for extracting inorganic salts selected from the group consisting of alkali metal, alkaline earth metal, and lead halides and chlorates from an aqueous solution which comprises;

contacting said aqueous solution with an extractant liquid thereby to extract said inorganic salt into the extractant liquid, said extractant liquid comprising an acid member selected from the group consisting of carboxylic acids, alkyl phosphoric acids, phosphonic acids, sulfonic acids or phenols, each of said members being a substantially water immiscible, organic acid, and a base member selected from the group consisting of substantially water immiscible base reacting primary-, secondary-, tertiary- or quaternary-amines, separating the resulting inorganic-salt-containing extractant liquid from the inorganic salt depleted aqueous raffinate, and removing the inorganic salt from the extractant liquid.

2. The process as defined in claim 1 wherein the substantially water immiscible extractant liquid is a solution of the acid and amine members in a substantially water immiscible organic liquid, said liquid serving as a solvent for said members and not detrimentally interacting therewith under operating conditions.

3. The process as defined in claim 2 wherein the acid and amine members constitute from about 20 to about 95 weight percent of the total solution.

4. The process as defined in claim 1 and including the step of stripping the inorganic salt from said organic extractant liquid and recycling the so-regenerated organic extractant liquid for subsequent extraction.

5. The process as defined in claim 4 wherein the inorganic salt is stripped from the organic extract by contacting it with water.

6. The process as defined in claim 1 wherein the substantially water immiscible extractant liquid comprises an organic acid and amine component in substantially equivalent amounts.

7. The process as defined in claim 1 wherein the aqueous solution contains caustic.

8. The process as defined in claim 1 wherein the aqueous solution comprises magnesium chloride and the acid member is a carboxylic organic acid.

9. The process as defined in claim 1 wherein the aqueous solution comprises magnesium chloride and sodium chloride and the acid member is a carboxylic organic acid and the amine member contains primary amine groups whereby magnesium values are recovered preferentially to sodium values.

10. The process of claim 1 wherein the aqueous solution comprises magnesium and calcium chlorides and the acid member is a phenol and the amine member contains quaternary amine groups, whereby calcium values are recovered preferentially to magnesium values.

11. The process of claim 8 and the additional step of stripping the organic extract with water.

12. The process of claim 9 and the additional step of stripping the organic extract with water.

13. The process of claim 10 and the additional step of stripping the organic extract with water.

* * * * *